United States Patent [19]
Wilkins

[11] Patent Number: 5,248,166
[45] Date of Patent: Sep. 28, 1993

[54] FLOWLINE SAFETY JOINT

[75] Inventor: Robert L. Wilkins, Houston, Tex.

[73] Assignee: Cooper Industries, Inc., Houston, Tex.

[21] Appl. No.: 861,283

[22] Filed: Mar. 31, 1992

[51] Int. Cl.$^5$ .................. F16L 37/02; F16L 27/08
[52] U.S. Cl. .......................................... 285/1; 285/24; 285/136; 285/151; 285/275; 285/3; 285/9.2; 285/93
[58] Field of Search .................. 285/1, 2, 3, 9.2, 24, 285/136, 190, 179, 151, 127, 272, 273, 93; 166/346, 340, 363

[56] References Cited

U.S. PATENT DOCUMENTS

| | | | |
|---|---|---|---|
| 2,752,197 | 6/1956 | Marco | 285/151 |
| 3,502,353 | 3/1970 | Burns | 285/2 |
| 3,659,877 | 5/1972 | Kubasta | 285/3 |
| 3,727,948 | 4/1973 | Current | 285/3 |
| 4,059,288 | 11/1977 | Mohr | 285/2 |
| 4,138,751 | 2/1979 | Kentosh | 285/136 |
| 4,361,165 | 11/1982 | Flory | 137/69 |
| 4,397,357 | 8/1983 | Hettingter | 166/346 |
| 4,501,442 | 2/1985 | Partus | 285/275 |
| 4,602,586 | 7/1986 | Ortloff | 285/136 |
| 4,928,997 | 5/1990 | Reisener et al. | 285/136 |

FOREIGN PATENT DOCUMENTS

| | | | |
|---|---|---|---|
| 3416109 | 10/1985 | Fed. Rep. of Germany | 166/346 |
| 2223074 | 3/1990 | United Kingdom | 285/136 |

Primary Examiner—Eric K. Nicholson

[57] ABSTRACT

A flowline safety joint having a tubular member supported from a subsea tree structure, an elbow having a horizontal passage therethrough and a vertical passage extending upwardly from said horizontal passage, a stab-in male member having a leading end, a trailing flowline connecting end, a passage therein and terminating short of said leading end and a vertical opening in said male member communicating with said vertical passage through said elbow when installed within said horizontal passage, and a flat surface surrounding the opening of said vertical opening in said male member. A seal providing a metal-to-metal seal between the lower end of the tubular member and the flat surface on said male member, and a swivel member for connecting said elbow to said tubular member, said swivel member including an element increasing the downward loading of said tubular on said seal to control the loading of said male member at which it releases from said horizontal passage through said elbow.

8 Claims, 2 Drawing Sheets

FLOWLINE SAFETY JOINT

BACKGROUND

The present invention relates to an improved safety joint for use with a flowline, particularly to provide a connection for subsea pipeline to a subsea well to avoid transmitting loading, which is imposed on the pipeline by such outside forces as a ship's anchor, to the subsea well.

It is known that many times subsea pipelines are subject to large loads resulting from ships' anchors. Many times such loads tends to move the pipelines away from their axis, producing a torsional load on their connection to the subsea well.

One method of protecting against such loading is to ensure that the subsea structures are reinforced to withstand the expected loading This solution is quite expensive.

Another method is to design the flowline to part or fail in order to prevent this loading from being transmitted to a subsea well. One particular disadvantage to such prior attempted solutions is that which the joints are normally a pressure balanced in-line safety joint, they normally include non-metal sealing and thus include a number of elastomeric seals, one or more of which are potential leak paths to the environment.

A typical example of a pressure balances safety pipeline connector is disclosed in U.S. Pat. No. 4,059,288 in which the two tubular components are held together by a shear and by pins carried by the pressure compensating piston and held in engagement with an external recesses in the inner member by a ring. Upon initial movement following the shearing of the disc, the ring is moved to release the pins to move out of the recesses and allow complete release of the two joint members.

U.S. Pat. No. 4,059,288 discloses another pipeline safety joint including a fluid-tight pressure compensation chamber and held together by frangible bolts and a latch. When there is sufficient loading to cause the failure of the bolts, then there is sufficient movement between the two joint member to allow the latch mechanism to release and complete the disengagement between the two portions of the joint.

Another type of pipe coupling which includes a pressure compensating devices also includes one of two valves which close automatically on the separations of the joint is discloses in U.S. Pat. No. 4,361,165.

U.S. Pat. Nos. 3,502,353 (shear pins), 3,659,877 (shear bolts connecting flanges) and 3,727,948 (shear pins in on member engage threads in the other member) all disclose breakaway tubular joints.

SUMMARY

The improved flowline safety joint of the present has particular application to subsea flowlines connecting to subsea wells and includes an elbow having an opening extending horizontally therethrough, a stab-in male member for entering and sealing within said opening, a vertical opening for receiving a tubular member therein, means for connecting the vertical tubular member to the elbow and urging it downwardly therein, and a metal-to-metal seal between the horizontal opening in the elbow and the stab-in male member, said elbow being rotatable with respect to said vertical tubular member.

An object of the present invention is to provide an improved flowline safety joint which can be preset to release at a predetermined tension loading of the line.

Another object is to provide an improved flowline safety joint in which there is an improved metal-to-metal seal.

A further object is to provide an improved flowline safety joint for a subsea pipeline which is relatively inexpensive with respect to prior attempts to limit damages to subsea pipelines to the release of their safety joints.

Still another object is to provide an improved flowline safety joint which allows rotation of the joint to cause release responsive to axial tension in the flowline.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 1:
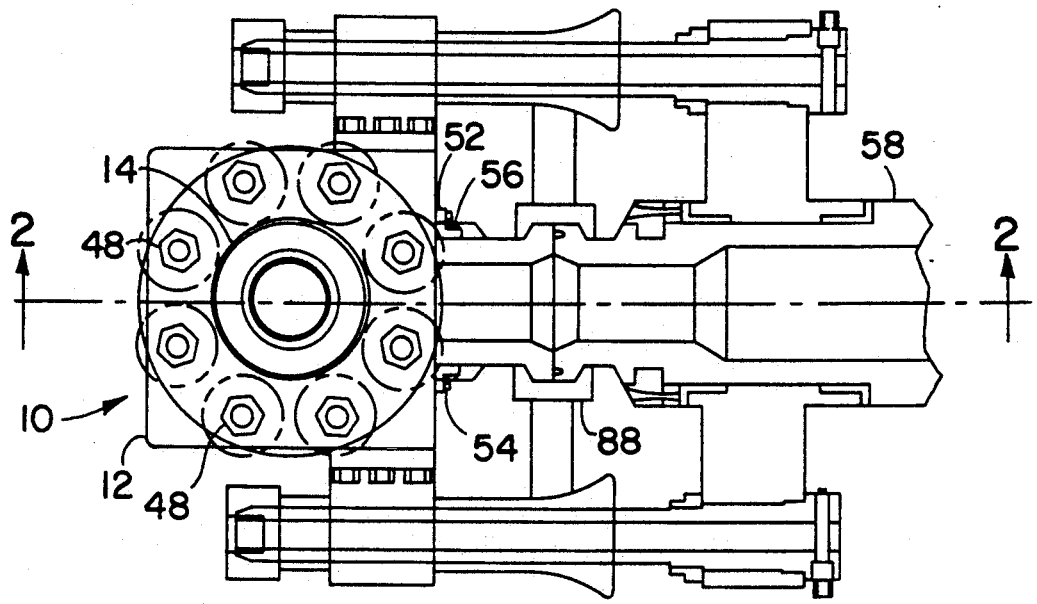
FIG. 1 is a plan view of the improved flowline safety joint of the present invention.

The improved pipeline safety joint 10 of the present invention is illustrated in FIGURES and 2 in its assembled condition. Joint 10 includes elbow 12, vertical tubular member 14, swivel connector 16 and stab-in male member 18. Elbow 12 is generally T-shaped having horizontal opening 20 extending therethrough and vertical opening 22 extending upwardly and communicating with opening 20 on the interior of elbow 12. Tubular member 14 is supported from subsea tree structure 24 by ring 26 which is engaged within upper external groove 28 of tubular member 14. Ring 26 is secured to subsea tree structure 24 by suitable fastening means 30, such as bolts. Lower external groove 32 has ring 34 positioned therein with a sufficient loose fit to allow rotation of swivel connector 16, elbow 12 and male member 18 about tubular member 14. Rings 26 and 34 are preferably half rings to allow easy installation within their respective grooves. Ring 26 is retained in its groove 28 by fastening means 30 and ring 34 is held in its groove 32 by flange 36 of swivel connector 16.

Flange 36 includes inner downwardly facing shoulder 38 which engages ring 34 and vertical openings 40 through which studs 42 extend to threadedly engage within threaded openings 44 in upper surface 46 surrounding vertical opening 22 of elbow 12. Nuts 48 are threaded on the upper ends of studs 42 and tighten against upper surface 50 of flange 36 to move tubular member 14 and elbow 12 vertically toward each other. Sufficient preload must be achieved by the tightening of nuts 48 to maintain sealing metal seal, hereinafter described, under pressure. This preload will determine minimum friction load to achieve separation. Angle brackets 52 are suitable secured to the exterior of male member 18 by cap screws 56 and are secured to the exterior of elbow 12 by tension limited retaining bolts 54. This structure of angle brackets 52 and bolts 54 provides an increase in the separating load for male member 18 as hereinafter discussed.

Figure 2:
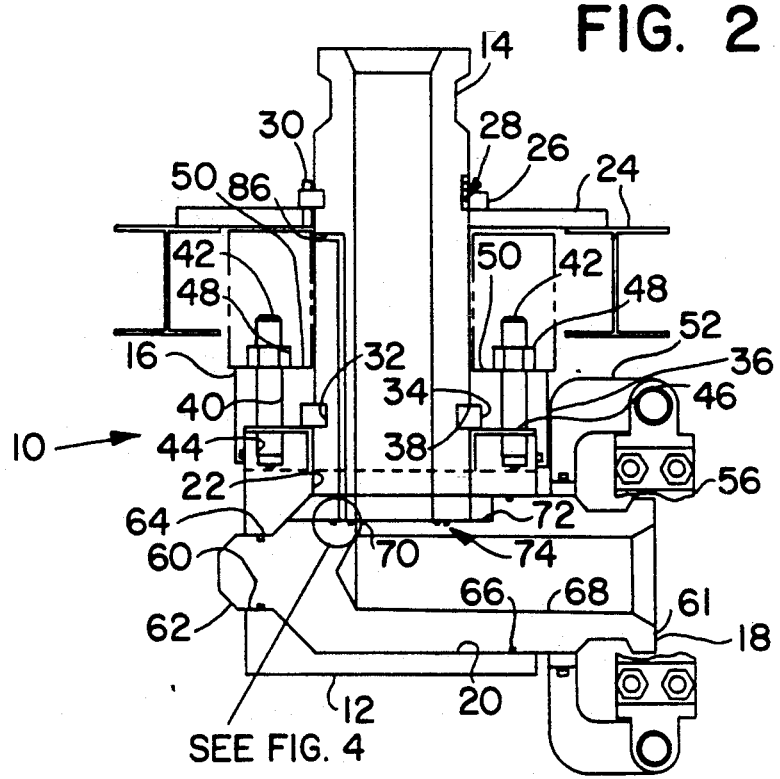
FIG. 2 is a sectional view taken along line 2—2 in FIG. 1.
Figure 3:
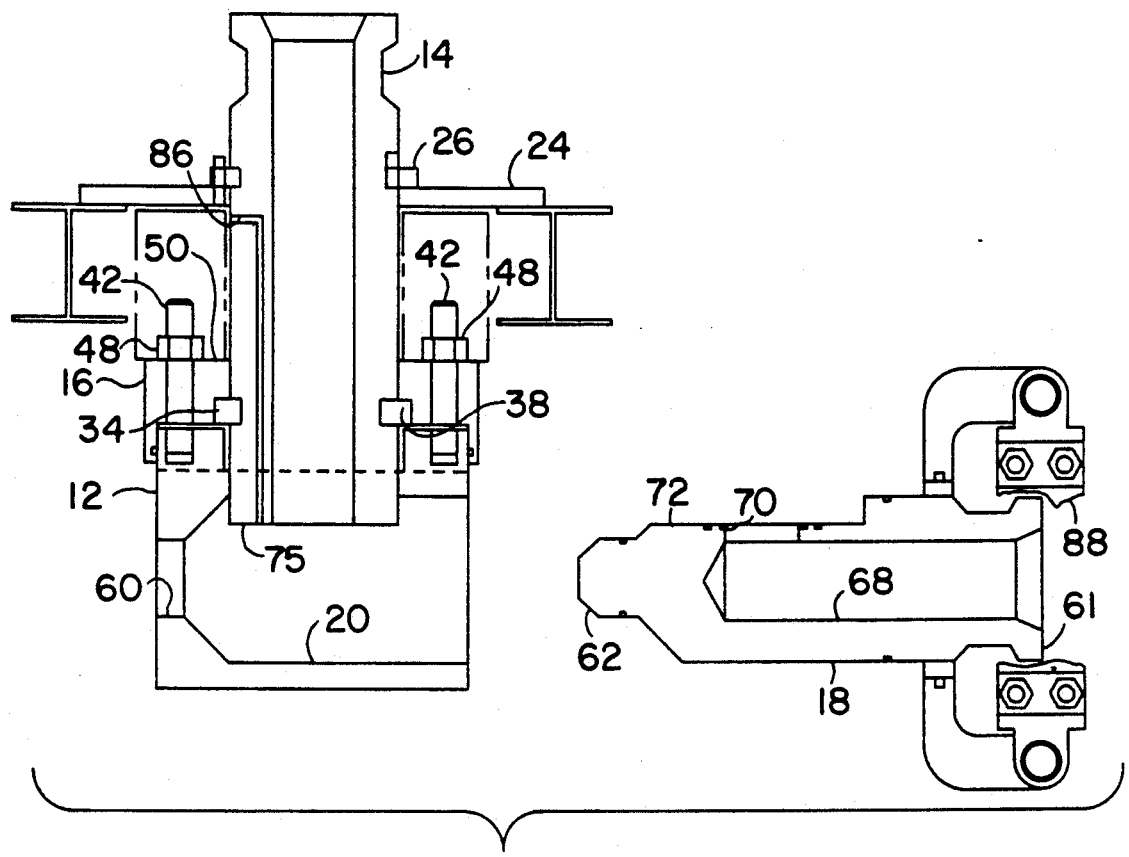
FIG. 3 is an exploded vertical sectional of the of the joint of the present invention with the stab-in male member separated from the remainder of the joint.

Horizontal opening 20 in elbow 12 is generally cylindrical from its large end past the opposite end of opening 22, then tapers inwardly to a smaller diameter which forms opening 60 extending through the remainder of elbow 12. Stab-in male member 18 is similarly formed to fit within opening 20 and includes nose end 62 which extends through reduced opening 60 with flanged end 61 being on the exterior of the opposite end of elbow opening 20 as shown. Suitable crud or trash seals 64 and 66 are provided around the exterior of nose end 62 and the exterior portion of member 18 which is immediately within opening 20 as shown in FIGS. 2 and 3. Male member 18 includes axial opening 68 from its flanged end 61 which opening 68 terminates short of its nose end 62 and communicates with vertical opening 70. Opening 70 extends upwardly and terminates in flattened surface 72.

Figure 4:
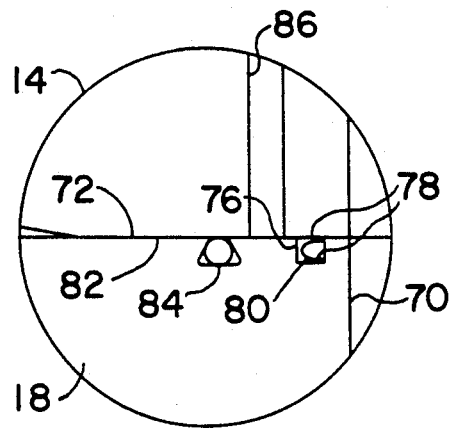
FIG. 4 is a partial sectional view of circle 4 in FIG. 2 enlarged to illustrate the metal-to-metal seal, the test seal and the test port.

The primary sealing means 74 for sealing between the lower sealing surface 75 of tubular member 14 and the flattened surface 72 of male member 18 is metal sealing ring, 76 which is best shown in FIG. 4. Sealing ring 76 is a U-shaped metal sealing ring having sealing lips 78, one of which is positioned within the bottom of groove 80 in flattened surface 72 and the other of which in its relaxed position projects above surface 72 so that it provides a seal against the lower end surface 75 of tubular member 14 upon initial engagement. Lips 78 of sealing ring 76 face toward opening 70 through the flattened surface 72 on male member 18 to ensure that pressures within the flowline, male member 18 and tubular member 14 do not leak. A test seal 84 is provided at a position on flattened surface 72 which is radially outward from groove 80 and test port 86 is positioned between test seal 84 and groove 80 with sealing ring 76. Test seal 84 is not intended to hold full line pressure but to hold sufficient pressure in the event that sealing ring 76 starts to fail to allow indication of such initial leakage via test port 86.

With stab-in male member 18 positioned within elbow 12 as shown and with swivel connection 16 tightened to provide the desired loading of sealing ring 76, a flowline with a flowline connection 58 is brought into engagement with the flanged 61 end of male member 18 and divers provide the setting of clamps 88 to secure flowline connection 58 to male member 1 8. Any further adjusting of the tightness of swivel connection studs 42 and nuts 48 can be made by the diver to ensure the proper setting of the load release or separation loading at which male member 18 separates from within horizontal opening 20 of elbow 12. In the event that such loading of tubular member 14 against flattened surface 72 does not provide a sufficiently high separation loading, angle brackets 52 can be installed with tension limited retaining bolts 54 being selected to add sufficient strength to provide the desired increase in separation loading. Thereafter, separation occurs only when the combined maximum loadings which are sustained by retaining bolts 54 and the loading between tubular member 14 and male member 18 resulting from the swivel connector makeup load, internal pressure and friction.

With the improved flowline safety joint 10 of the present invention, any engagement of the flowline by an anchor which provides a side load on the flowline will cause a rotation of swivel connection 16 and elbow 12 about tubular member 14 so that no torque is transmitted thereto. Also, with this movement the forces tend to be more directly aligned with the axis of male member 18 and will pull it from its position within elbow 12 whenever the preselected separation, release loading is reached.

The single metal-to-metal seal of the improved flowline safety joint is a substantial improvement over the multiple resilient seals of the prior art devices and further provides the adjustable frictional loading which determines the release loading for the disconnection of male member 18 from within elbow 12.

As shown, male member 18 is shown to be a separate member from flowline 58, it could be an integral part thereof which is machined to have the desired configuration for mating with elbow 12 or it could be a separate member with the desired configuration for mating with the interior of elbow 12 which is welded to flowline 58, thus eliminating the clamps 88. The connections of male member, when integral with flowline 58, to elbow 12 would be made up by divers who also will make up the swivel flange connection. Divers will normally be used in all forms of the invention for making such connections and for their adjustment to provide the desired preloading of the metal sealing ring and the friction loading between tubular member 14 and male member 18.

What is claimed is:

1. A flowline safety joint comprising
    a vertical tubular member,
    an elbow having a horizontal opening therethrough and a vertical passage opening upwardly and sufficiently large to receive said vertical tubular member therein,
    a stab-in male member having leading end and a trialing end, a size and shape to be positioned within said horizontal opening and having a central opening extending through a portion of said male member and terminating in the end of said male member short of the leading end of the male member and a vertical opening communicating through said male member when installed in said elbow to the interior of said vertical tubular member, and
    means rotatably connecting said elbow to said vertical tubular member and providing a loading sufficient to retain said male member in said horizontal opening in said elbow prior to the loading on said male member reaching a release loading.

2. A flowline safety joint according to claim 1 including
    sealing means surrounding said vertical opening in said male member and sealing between the male member and the lower end of said tubular member.

3. A flowline safety joint according to claim 2 wherein said sealing means is a metal sealing ring, and said means connecting said elbow to said tubular member providing sufficient preloading to maintain the seal of said metal sealing ring and to provide adjustable friction loading between said tubular member and said male member.

4. A flowline safety joint according to claim 1 including
    a flat portion surrounding the upper portion of the vertical opening in said male member, and
    a metal sealing ring positioned in a groove in one of said flat portion of said male member and the lower end of said tubular member,
    the lower end of said tubular member engaging said flat portion of said male member when said joint is assembled.

5. A flowline safety joint according to claim 4 wherein said rotatable connecting means includes
means for controlling the loading of the lower end of said tubular member against the sealing ring to control the loading on said male member necessary to release said male member from said elbow.

6. A flowline safety joint according to claim 1 including
means securing said tubular member to a subsea tree structure.

7. A flowline safety joint according to claim including
means releasably securing male member within said elbow and having a preselected tension limit release point which will increase the tension loading of the flowline on the safety joint.

8. A flowline safety joint according to claim 3 including
a test seal surrounding said metal sealing ring, and
a test port communicating in the area between said metal sealing ring and said test seal to provide an indication of leakage of said metal sealing ring.

* * * * *